No. 763,217. PATENTED JUNE 21, 1904.
H. W. STEINMANN.
INSECT COLLECTING AND DESTROYING MACHINE.
APPLICATION FILED MAY 26, 1903.
NO MODEL. 2 SHEETS—SHEET 1.
Fig.1.
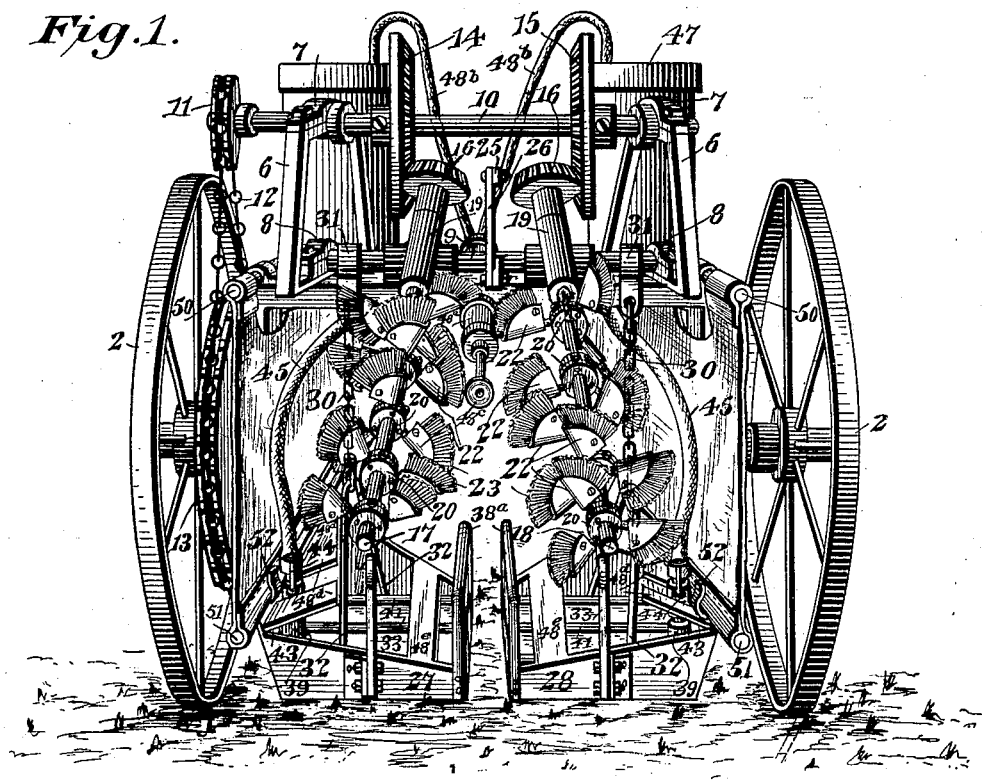
Fig.4.
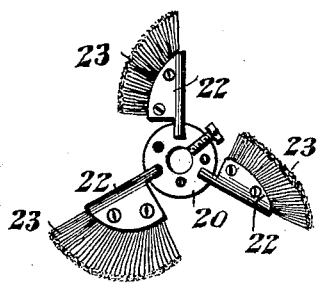
Fig.5.
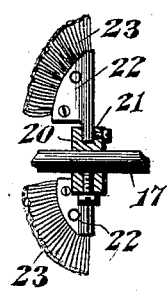
Fig.6.
Herman W. Steinmann, Inventor
Witnesses
By
Attorney No. 763,217. PATENTED JUNE 21, 1904.
H. W. STEINMANN.
INSECT COLLECTING AND DESTROYING MACHINE.
APPLICATION FILED MAY 26, 1903.
NO MODEL. 2 SHEETS—SHEET 2.
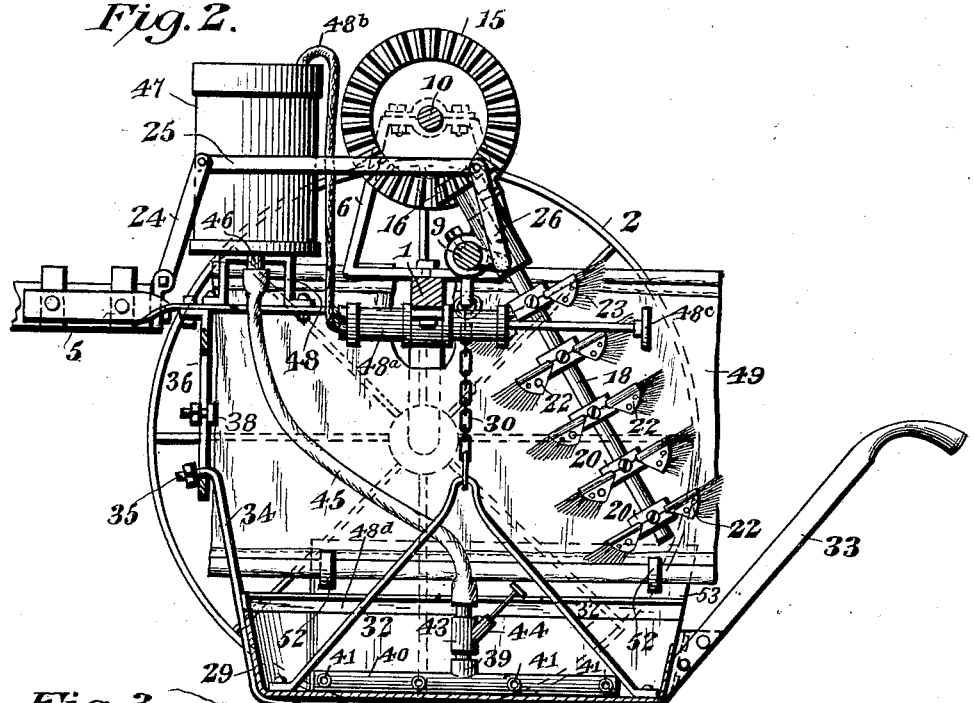
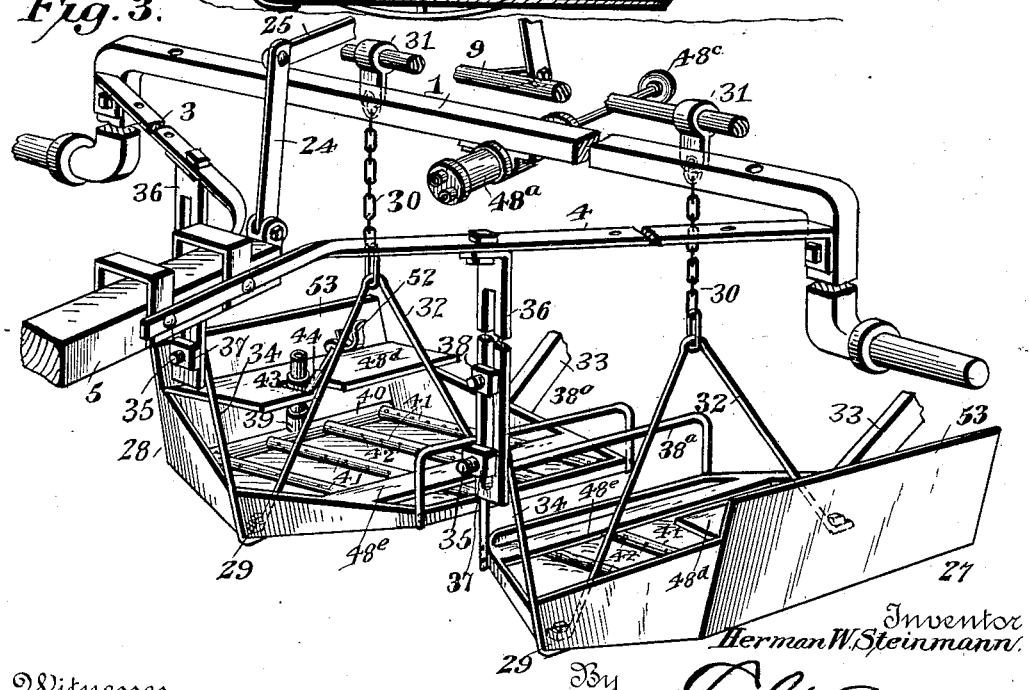
Witnesses
Jas. H. McLathran
Louis G. Julihn
Inventor
Herman W. Steinmann
By E. G. Siggers
Attorney No. 763,217. Patented June 21, 1904.

UNITED STATES PATENT OFFICE.

HERMAN WERNER STEINMANN, OF TEMPLE, TEXAS.

INSECT COLLECTING AND DESTROYING MACHINE.

SPECIFICATION forming part of Letters Patent No. 763,217, dated June 21, 1904.

Application filed May 26, 1903. Serial No. 158,852. (No model.)

*To all whom it may concern:*

Be it known that I, HERMAN WERNER STEINMANN, a citizen of the United States, residing at Temple, in the county of Bell and State of Texas, have invented a new and useful Insect Collecting and Destroying Machine, of which the following is a specification.

This invention relates to an insect collecting and destroying machine designed particularly for the collection of the boll-weevil and infected forms from cotton-plants and for the destruction of the insects and infected vegetation.

By way of premise it may be stated that the boll-weevil is an insect found in such numbers upon cotton-plants as to constitute a serious menace to the cotton industry, and various expedients have been resorted to for the destruction of both the insects and the eggs with which the plants are infested.

The object of my invention is to produce a machine designed to be manipulated in a manner similar to that of a straddle-row cultivator and including receptacles or receivers flexibly suspended at opposite sides of the row of plants from a wheeled frame and disposed subjacent to devices designed to precipitate the insects into the receivers from the plants as the machine is drawn across the field—as, for instance, by draft-animals.

A further object of the invention is to equip the receivers with means for destroying the insect life simultaneously with the collection thereof, so as to avoid the necessity for the subsequent destruction of the insects, as is necessary where an ordinary insect-collecting apparatus is employed.

In addition to the objects recited others subordinate thereto will appear during the course of the succeeding description of the illustrated embodiment of the invention.

In the accompanying drawings, Figure 1 is a perspective view of my machine complete viewed from the rear. Fig. 2 is a vertical longitudinal section thereof. Fig. 3 is a perspective view of a portion of the machine designed particularly for the illustration of the receivers and supporting device therefor. Fig. 4 is a detail view of one of the fan members. Fig. 5 is a similar view, partly in section. Fig. 6 is a detail view of one of the individual brushes, a plurality of which constitute a fan-section.

Like numerals of reference are employed to designate corresponding parts throughout the views.

The frame of the machine includes an arched axle 1, supported by vehicle-wheels 2 and connected by bars 3 and 4, converging from the vertical portions of the axle-arch, with a suitable tongue 5, to which the draft-animals are designed to be attached in the ordinary manner. Adjacent to the opposite ends of the axle-arch are supported a pair of vertical standards 6, provided with upper and lower bearings 7 and 8, in which are journaled a rock-shaft 9 and a driving-shaft 10. The driving-shaft is designed to be driven from one of the vehicle-wheels 2 and is therefore provided at one end with a sprocket-wheel 11, geared by a sprocket-chain 12 to a comparatively large driving-sprocket 13, secured to one of the vehicle-wheels for movement therewith, as clearly shown in Fig. 1 of the drawings. It should be understood, however, that the manner of gearing the driving-shaft to the vehicle-wheel is not essential, and any other form of gearing may therefore be substituted for that shown.

Keyed or otherwise secured upon the driving-shaft 10 are a pair of oppositely-disposed miter-gears 14 and 15, which mesh with miter-pinions 16, secured to the upper front ends with a pair of fan-shafts 17 and 18. These shafts diverge rearwardly and are normally inclined, as best shown in Fig. 3. Adjacent to their upper ends these shafts are journaled in comparatively long bearings 19, fixed upon the rock-shaft 9 and designed to maintain the fan-shafts in their proper relative positions during the advance of the machine. It will be obvious that by reason of the opposed relation of the gears 14 and 15 the fan-shafts will be rotated in opposite directions. The inner sides of the shafts opposed to the intermediate row of plants thus move downwardly or forwardly. The fan-shafts are designed for the support and actuation of two series of fans or fan members, each shaft being equipped with a plurality of spaced heads 20, preferably, though not necessarily, of circular form and provided with any desired number of sockets 21 for the reception of brush-clamps 22, constructed in any suitable manner to retain a brush 23 of broom-corn, fine steel wire, or other similar material adapted to brush the insects from the plants without injury to the latter and without danger of detaching the growing cotton from the bolls. The described construction of these fan-sections makes it possible to use any desired number of brushes in connection with each head or brush-block and also permits a greater or less number of such sections to be employed in accordance with the varying conditions of use. Furthermore, the mounting of the individual fan-sections or brushes permits them to be disposed at any desired angle, according to the desires of the individual user. For instance, these brushes may be turned square across the plane of rotation, or, as shown in the drawings, they may be disposed in substantially spiral formation. The inclination of the fan-shafts may be adjusted in a variety of ways to accommodate the machine to plants of different heights. Inasmuch, however, as a wide range of adjustment is not necessary, I have provided a connection between the rock-shaft 9 and the tongue 5, whereby the adjustments of the fan-shafts may be regulated by the slight elevation or depression of the tongue. This connection comprehends an arm 24, secured to the rear end of the tongue 5 and connected, as by a link 25, with an arm 26, secured to the rock-shaft.

The insects detached from the plants are caught by a pair of receivers 27 and 28 in the form of shallow open-topped pans having peaked or pointed front ends 29, so constructed in order to provide a splayed entrance-throat to the passage defined between the adjacent or inner edges of the receivers. These receiver or pans are flexibly suspended from the frame of the machine—as, for instance, by chains 30, secured at their upper ends to clips 31 and at their lower ends to bails 32, disposed longitudinally of the pans. (See Fig. 2.) The pans or receivers may thus be swung laterally by means of handles 33 at their rear ends, so that the operator walking behind the machine may by proper manipulation of the receivers retain them at all times in position to receive the insects without permitting them to strike violently against the stalks of the growing plants. It is also desirable to accommodate the receivers to the unevenness of the ground, since they move in close proximity to the latter. This end may be obtained by providing each receiver at its front end with an upstanding brace-rod 34, having an angular end 35 passed through a slotted bracket 36, pendent from one of the brace-rods 3 or 4 of the frame. The ends of the braces are retained in engagement with the brackets 36, by nuts 37, (see Fig. 3,) and the vertical play of said end within the slot may be limited by an adjustable stop 38 of any desired construction. For the purpose of holding up the lower limbs of the plants in order to prevent the injury thereof each of the receivers is provided at its inner side with a longitudinal vertical arch 38$^a$, which rides under the limbs or branches and holds them up away from the receivers during the passage of the machine.

It will now be apparent that as the machine is drawn over the ground with a fan-shaft and receiver located at each side of the row of plants the fans will be rapidly rotated and the insects and infected vegetation will be precipitated into the receivers guided by the operator in the manner described.

The construction thus far recited is thought to embrace substantial novelty, since it will of course be possible to effect the subsequent destruction of the insect life thus collected. I contemplate the immediate destruction of the insects, however, and for this purpose provide each receiver with a burner, (indicated as a whole by 39.) Each burner comprises an oil-pipe 40, extending longitudinally of the receiver adjacent to its outer wall, and a series of parallel jet-tubes 41, extending transversely across the bottom of the receiver from the pipe 40 and each provided in one side thereof with a series of jet-openings 42, from which jets of flame are designed to be projected, so that the entire bottom of the reservoir will be a mass of fire, into which the insects will be precipitated for immediate destruction. The pipe 40 is provided with a nipple 43, containing a controlling-valve 44 and designed for the attachment of the lower end of a flexible tube 45, coupled at its upper end to the nipple 46 of an oil-tank 47. These oil-tanks 47 for the supply of the two burners may be of any character; but they are preferably comparatively small metal tanks carried by suitable brackets 48, supported upon the frame-bars 3 and 4. It should be understood, however, that the form of burner illustrated in the drawings is only one of many which may be employed. In fact, a simple and efficient burner includes only a single perforate pipe disposed lengthwise of the receiver adjacent to its inner edge.

In order to insure the proper feed of oil to the burners under all conditions, I provide for a forced feed by mounting at any suitable point—as, for instance, upon the axle—an air-pump 48$^a$, communicating with the upper ends of the oil-tanks by tubes 48$^b$. The handle 48$^c$ of the pump extends rearwardly to bring it within convenient reach of the operator, as shown. At the outer sides of the pans of the receivers are disposed longitudinal flame guards or fenders 48$^d$, extended somewhat over the receiver, as shown, to prevent the flame from the burner from injuring the plants. It is also desirable to provide additional fenders 48$^e$ in the form of metal strips disposed longitudinally of the receivers at the inner sides thereof.

For the purpose of preventing the escape of such insects as may be thrown back violently by the fans I provide flexible guards or curtains 49, suspended from rods 50, supported upon the opposite ends of the axle-arch. At their lower edges these curtains are weighted by rods 51, retained by hooks 52, extending inwardly from the outer walls 53 of the receivers, said walls being of sufficient height to extend in lapping relation with the lower edges of the curtains 49.

Briefly, the operation of the machine is as follows: Assuming the parts to be disposed as shown in Fig. 1, the operator grasps the handles 33 and so manipulates the receivers as the machine is drawn across the field that they will be held close under the opposite sides of the plants without getting into injurious contact with the cotton-stalks. The fans being rotated at a sufficiently high rate of speed will either blow or brush the insects and infected vegetation into the receivers from the plants, and the bottoms of the receivers being covered by jets of flame issuing from the jet-tubes of the burner the vermin will be completely destroyed.

It is thought that from the foregoing the construction and operation of my novel insect collecting and destroying machine will be clearly apparent; but while the present embodiment of the invention is thought at this time to be preferable I wish to be clearly understood as reserving to myself the right to effect such changes, modifications, and variations of the illustrated structure as may fall within the scope of the protection prayed.

What I claim is—

1. In a machine of the character described, the combination with a wheeled frame, of a receiver supported by the frame and arranged for disposal adjacent to a row of plants to receive insects, and means for maintaining combustion in the receiver.

2. In a machine of the character described, the combination with a wheeled frame, of a receiver supported by the frame and arranged for disposal adjacent to a row of plants, means for maintaining combustion in the receiver, and means located above the receiver to contact with the plants and cause insects and infected vegetation to be precipitated into the receiver therefrom.

3. In a machine of the character described, the combination with a wheeled frame, of a receiver suspended from the frame, means for maintaining combustion in the receiver, and a rotary device located above the receiver to effect the precipitation of insects and infected vegetation into the receiver from the plants.

4. In a machine of the character described, the combination with a wheeled frame, of a receiver supported therefrom and arranged for disposal adjacent to a row of plants, a burner associated with the receiver, and means for supplying fuel to the burner.

5. In a machine of the character described, the combination with a wheeled frame, of a receiver pendent from the frame, a burner associated with the receiver, a fuel-tank carried by the frame, and a flexible tube connecting the tank and burner.

6. In a machine of the character described, the combination with a wheeled frame, of a receiver flexibly suspended from the frame, a burner located in the receiver, means for supplying fuel to the burner, and a rotary device located above the receiver to effect the precipitation of insects and infected vegetation into the receiver from the plants.

7. In a machine of the character described, the combination with a wheeled frame, of a receiver flexibly suspended from the frame and arranged for disposal adjacent to a row of plants, a burner within the receiver, a fuel-supply tank carried by the frame, a flexible tube connecting the burner with the tank, a rotary device located above the receiver to precipitate insects and infected vegetation therein from the plants, and means operatively connecting said device with a wheel.

8. In a machine of the character described, the combination with a wheeled frame, of a pair of laterally-spaced receivers arranged for disposal at opposite sides of a row of plants, and means for maintaining combustion in the receivers.

9. In a machine of the character described, the combination with a wheeled frame, of a pair of laterally-spaced receivers suspended therefrom, burners located in the receivers, and means for supplying fuel to the burners.

10. In a machine of the character described, the combination with a wheeled frame, of a pair of flexibly-suspended receivers, burners located in the receivers, flexible tubes connected with the burners, means for supplying fuel to the burners through the tubes, a rotary device located above each receiver to effect the precipitation of insects and infected vegetation therein, and means for operating said rotary device from the wheels.

11. In a machine of the character described, the combination with a wheeled frame, of a receiver supported from the frame and arranged for disposal adjacent to a row of plants, means for maintaining combustion in the receiver, a fan-shaft, a plurality of fan-sections spaced longitudinally upon the shaft, and means for rotating the shaft.

12. In a machine of the character described, the combination with a wheeled frame, of a receiver supported by the frame, a burner associated with the receiver, a downwardly and rearwardly inclined fan-shaft located above the receiver, a plurality of fan-sections mounted on the shaft, and means for rotating said shaft to effect the precipitation of insects and infected vegetation into the receiver from the plants.

13. In a machine of the character described, the combination with a wheeled frame, of a receiver supported therefrom, an inclined fan-shaft located above the receiver, means for rotating the shaft, and a plurality of fan-sections located at different points in the length of the shaft and each comprising a series of brushes.

14. In a machine of the character described, the combination with a wheeled frame, of a pair of receivers supported thereby and arranged for disposal at opposite sides of a row of plants, a pair of fan-shafts disposed above the receivers and arranged in divergent relation, fans mounted on the fan-shafts, and means for rotating the shafts.

15. In a machine of the character described, the combination with a wheeled frame, of a pair of receivers pendent from the frame, and arranged for disposal at opposite sides of a row of plants, a pair of rearwardly-divergent fan-shafts supported by the frame above the receivers, a plurality of fan-sections carried by each of the shafts, and gearing connecting the fan-shafts with one of the wheels of the machine to rotate said shafts in opposite directions.

16. In a machine of the character described, the combination with a wheeled frame, of a pair of receivers pendent from the frame and arranged for disposal at opposite sides of a row of plants, a pair of rearwardly-divergent fan-shafts supported by the frame above the receivers, fans carried by said shafts, means for rotating the fan-shafts in opposite directions, a burner in each of the receivers, and means for supplying fuel to the burners.

17. In a machine of the character described, the combination with a wheeled frame, of a pair of receivers pendent therefrom, rotary fans located above the receivers, means for rotating the fans in opposite directions, a burner in each receiver, a fuel-supply tank for each burner, and a flexible tube connecting each burner with one of the tanks.

18. In a machine of the character described, the combination with a wheeled frame, of a receiver disposed adjacent to the ground and supported from the frame, a burner associated with the receiver, a shield extending vertically above the outer side of the receiver, and a device located above the receiver for precipitating insects and infected vegetation therein.

19. A receiver for insect collecting and destroying machines, comprising a receptacle and a burner therein, said burner including a pipe having connection with a source of fuel-supply, and a plurality of jet-tubes extended across the bottom of the receiver from the pipe.

20. In a machine of the character described, the combination with a frame, a laterally-movable receiver and means for precipitating insects and infected vegetation therein, of means carried by and movable with the receiver to support the plants.

21. In a machine of the character described, the combination with a pair of laterally-spaced receivers arranged for disposal at opposite sides of a row of plants, of means for precipitating insects and infected vegetation into the receivers, and arches carried by the receivers at their inner sides to support the plants.

22. In a machine of the character described, the combination with a receiver and means for producing combustion therein, of means for precipitating insects and infected vegetation into the receiver, and a guard or fender extended above the receiver to prevent injury to the plants.

23. In a machine of the character described, the combination with a receiver, a burner therein and means for precipitating insects and infected vegetation into the receiver, of flame-fenders disposed at opposite sides of the receiver and extended thereover to protect the plants from injury.

24. In a machine of the character described, the combination with a frame and a receiver disposed to receive insects and infected vegetation, of a burner located in the receiver, a fuel-tank in communication with the burner, and a pump for forcing the fuel from the tank to the burner.

25. The combination with a wheeled frame; of a receiver pendent from the frame, and a burner associated with the receiver.

26. The combination with a wheeled frame, of a receiver suspended from the frame, a burner in the receiver, means for supplying fuel to the burner, and a device located above the receiver to effect the precipitation of insects and infected vegetation therein from the plants.

27. The combination with a wheeled frame, of a receiver suspended from the frame and arranged for disposal adjacent to a row of plants, a burner within the receiver, a device located above the receiver to precipitate insects and infected vegetation therein from the plants, and means operatively connecting said device with a wheel.

In testimony that I claim the foregoing as my own I have hereto affixed my signature in the presence of two witnesses.

HERMAN WERNER STEINMANN.

Witnesses:
GEORGE H. KOEGLER,
C. R. RAUKER.